United States Patent
Takeda

(10) Patent No.: US 10,142,037 B2
(45) Date of Patent: Nov. 27, 2018

(54) MEASUREMENT DEVICE AND MEASUREMENT METHOD

(71) Applicant: ANRITSU CORPORATION, Kanagawa (JP)

(72) Inventor: Eiji Takeda, Kanagawa (JP)

(73) Assignee: ANRITSU CORPORATION, Kanagawa (JP)

(*) Notice: Subject to any disclaimer, the term of this patent is extended or adjusted under 35 U.S.C. 154(b) by 0 days.

(21) Appl. No.: 15/349,085

(22) Filed: Nov. 11, 2016

(65) Prior Publication Data

US 2017/0230122 A1    Aug. 10, 2017

(30) Foreign Application Priority Data

Feb. 8, 2016    (JP) .................................. 2016-021735

(51) Int. Cl.
*H04B 17/00* (2015.01)
*H04B 17/309* (2015.01)

(52) U.S. Cl.
CPC ....... *H04B 17/0085* (2013.01); *H04B 17/309* (2015.01)

(58) Field of Classification Search
CPC .. H04B 7/0413; H04B 17/00; H04B 17/0085; H04B 3/46
See application file for complete search history.

(56) References Cited

U.S. PATENT DOCUMENTS

| | | | | |
|---|---|---|---|---|
| 2004/0142686 A1* | 7/2004 | Kirkup | ................ | H04L 63/0227 455/420 |
| 2004/0266423 A1* | 12/2004 | Morikawa | ............. | H04W 24/00 455/424 |
| 2012/0252372 A1* | 10/2012 | Kihara | .................... | H04M 1/24 455/67.14 |
| 2013/0210370 A1* | 8/2013 | Misaki | ................... | H04B 17/00 455/67.14 |
| 2013/0295858 A1 | 11/2013 | Olgaard et al. | | |
| 2015/0078196 A1* | 3/2015 | Olgaard | ................ | H04W 24/06 370/253 |

FOREIGN PATENT DOCUMENTS

| | | |
|---|---|---|
| JP | 2005-012274 A | 1/2005 |
| JP | 2015523759 A | 8/2015 |

* cited by examiner

*Primary Examiner* — Yuwen Pan
*Assistant Examiner* — Fatuma G Sherif
(74) *Attorney, Agent, or Firm* — Pearne & Gordon LLP

(57) ABSTRACT

A measurement device 100 includes a measurement section 10 and the like, and the measurement section 10 includes an SA 14 that receives a signal for measuring transmission characteristics with a frequency in a predetermined frequency band from a DUT 1, an SG 15 that outputs a signal for measuring reception characteristics with a frequency in a predetermined frequency band to the DUT 1, a band storage section 16 that stores information on a frequency band handled by the measurement section 10, and a band setting section 12 that sets a frequency band handled by the SA 14 and the SG 15 on the basis of information of a frequency band handled by other measurement sections 20, 30, and 40.

9 Claims, 7 Drawing Sheets

MEASUREMENT DEVICE AND MEASUREMENT METHOD

TECHNICAL FIELD

The present invention relates to a measurement device and a measurement method capable of simultaneously measuring characteristics of a plurality of devices to be measured.

BACKGROUND ART

As this type of measurement device, a system for testing a multiple input multiple output (MIMO) signal receiver using a large number of RF signal testers is conventionally known (for example, see Patent Document 1).

This system of the related art includes a large number of signal generation devices and signal analysis devices, and transmission characteristics and reception characteristics of a device to be measured can be measured using a large number of RF signals.

RELATED ART DOCUMENT

Patent Document

[Patent Document 1] JP-T-2015-523759

DISCLOSURE OF THE INVENTION

Problem that the Invention is to Solve

Incidentally, in a case where a device to be measured capable of using a plurality of frequency bands is a measurement target, a configuration capable of simultaneously measuring a plurality of devices to be measured may be considered in order to achieve efficiency of measurement. In this case, there is a need to avoid measurements of the same frequency band so that a measurement signal for one device to be measured and a measurement signal of another device to be measured do not interfere.

However, in a device of the related art disclosed in Patent Document 1, signal interference of the same frequency band is not considered. Thus, there is a problem in that measurement accuracy cannot be ensured in a case where a plurality of devices to be measured capable of using a plurality of frequency bands are measurement targets.

The present invention has been made to solve the conventional problems, and an object thereof is to provide a measurement device and a measurement method capable of preventing signal interference to achieve improvement of measurement accuracy even when a plurality of devices to be measured capable of using a plurality of frequency bands are measurement targets.

Means for Solving the Problem

A measurement device according to claim 1 of the present invention includes a plurality of measurement means (10, 20, 30, and 40) that are respectively connected to a plurality of devices to be measured (1 to 4) capable of using a plurality of frequency bands, and perform measurements of at least one of transmission characteristics and reception characteristics of the plurality of devices to be measured in parallel using different communication frequency bands.

With this configuration, the measurement device according to claim 1 of the present invention measures at least one of transmission characteristics and reception characteristics of the plurality of devices to be measured in parallel using signals in different communication frequency bands. Thus, it is possible to prevent signal interference and achieve improvement of measurement accuracy even when a plurality of devices to be measured capable of using a plurality of frequency bands are measurement targets.

In the measurement device according to claim 2 of the present invention, each of measurement means includes: signal input means (14, 24, 34, 44) for receiving a signal for measuring the transmission characteristics with a frequency in a communication frequency band from each of the plurality of measurement devices, respectively; and signal output means (15, 25, 35, 45) for outputting a signal for measuring the reception characteristics with a frequency in a communication frequency band to each of the plurality of devices to be measured, respectively, and the measurement device further includes: band information storage means (103) for storing information on the communication frequency bands handled by the plurality of signal input means and the plurality of signal output means; band setting means (105) for setting a communication frequency band handled by the plurality of signal input means and the plurality of signal output means; and band management means (104) for executing a process of storing information on a communication frequency band handled by the plurality of signal input means and the plurality of signal output means in the band information storage means, and clearing the information on the used communication frequency band from the band information storage means when the plurality of signal input means and the plurality of signal output means end measurement, the band setting means outputs a use request for use of the signal input means or the signal output means and a communication frequency band desired to be used, to the band management means, and the band management means determines permission or refusal in response to the use request on the basis of the information on the communication frequency band stored in the band information storage means with respect to the band setting means.

With this configuration, in the measurement device according to claim 2 of the present invention, the signal input means and the signal output means measure the transmission characteristics and the reception characteristics of respective devices to be measured using different communication frequency bands. Thus, it is possible to prevent signal interference and achieve improvement of measurement accuracy even when a plurality of devices to be measured capable of using a plurality of frequency bands are measurement targets.

In the measurement device according to claim 3 of the present invention, the band management means determines refusal when the communication frequency band for which the use request is made is already stored in the band information storage means, and determines permission when the communication frequency band for which the use request is made is not stored in the band information storage means and stores information on the communication frequency band for which the use request is made in the band information storage means.

In the measurement device according to claim 4 of the present invention, in the plurality of measurement means, the band information storage means is included in the plurality of measurement means, and includes a plurality of used band information storage means (16, 26, 36, 46) for storing information on a communication frequency band handled by the signal input means and the signal output means of the own measurement means; and the band setting means is included in the plurality of measurement means, and includes used band setting means (12, 22, 32, and 42) for setting the communication frequency band handled by the signal input means and the signal output means of the own measurement means on the basis of information on the communication frequency band stored in the used band information storage means of another measurement means.

The measurement device according to claim 5 of the present invention further includes control means (101*a*) including the band information storage means, the band management means, and the band setting means, and collectively performing processes on respective pieces of frequency band information of the plurality of measurement means.

In the measurement device according to claim 6 of the present invention, the signal input means is signal analysis means for analyzing a signal input from the device to be measured, the measurement device further comprises measurement parameter registration means (52, 62, 72, and 82) for registering predetermined measurement parameters before start of measurement, and the signal analysis means analyzes a signal input from the device to be measured on the basis of the measurement parameters.

In the measurement device according to claim 7 of the present invention, the signal output means is signal generating means for generating a signal to be output to the device to be measured, the measurement device further comprises measurement parameter registration means (52, 62, 72, and 82) for registering predetermined measurement parameters before start of measurement, and the signal generating means generates a signal to be output to the device to be measured on the basis of the measurement parameters.

A measurement method according to claim 8 of the present invention is a measurement method using a measurement device comprising a plurality of measurement means (10, 20, 30, and 40) that are respectively connected to a plurality of devices to be measured (1 to 4) capable of using a plurality of frequency bands, and perform measurements of at least one of transmission characteristics and reception characteristics of the plurality of devices to be measured in parallel using different communication frequency bands, the measurement method including performing the measurements of at least one of the transmission characteristics and the reception characteristics of the plurality of devices to be measured in parallel using signals in different communication frequency bands.

With this configuration, the measurement method according to claim 8 of the present invention measures at least one of transmission characteristics and reception characteristics of the plurality of devices to be measured in parallel using signals in different communication frequency bands. Thus, it is possible to prevent signal interference and achieve improvement of measurement accuracy even when a plurality of devices to be measured capable of using a plurality of frequency bands are measurement targets.

Advantage of the Invention

The present invention can provide a measurement device and a measurement method having an effect that it is possible to prevent signal interference and achieve improvement of measurement accuracy even when a plurality of devices to be measured capable of using a plurality of frequency bands are measurement targets.

BEST MODE FOR CARRYING OUT THE INVENTION

Hereinafter, embodiments of the present invention will be described with reference to the accompanying drawings.

First Embodiment

First, a configuration of a first embodiment of a measurement device will be described according to the present invention.

Figure 1:
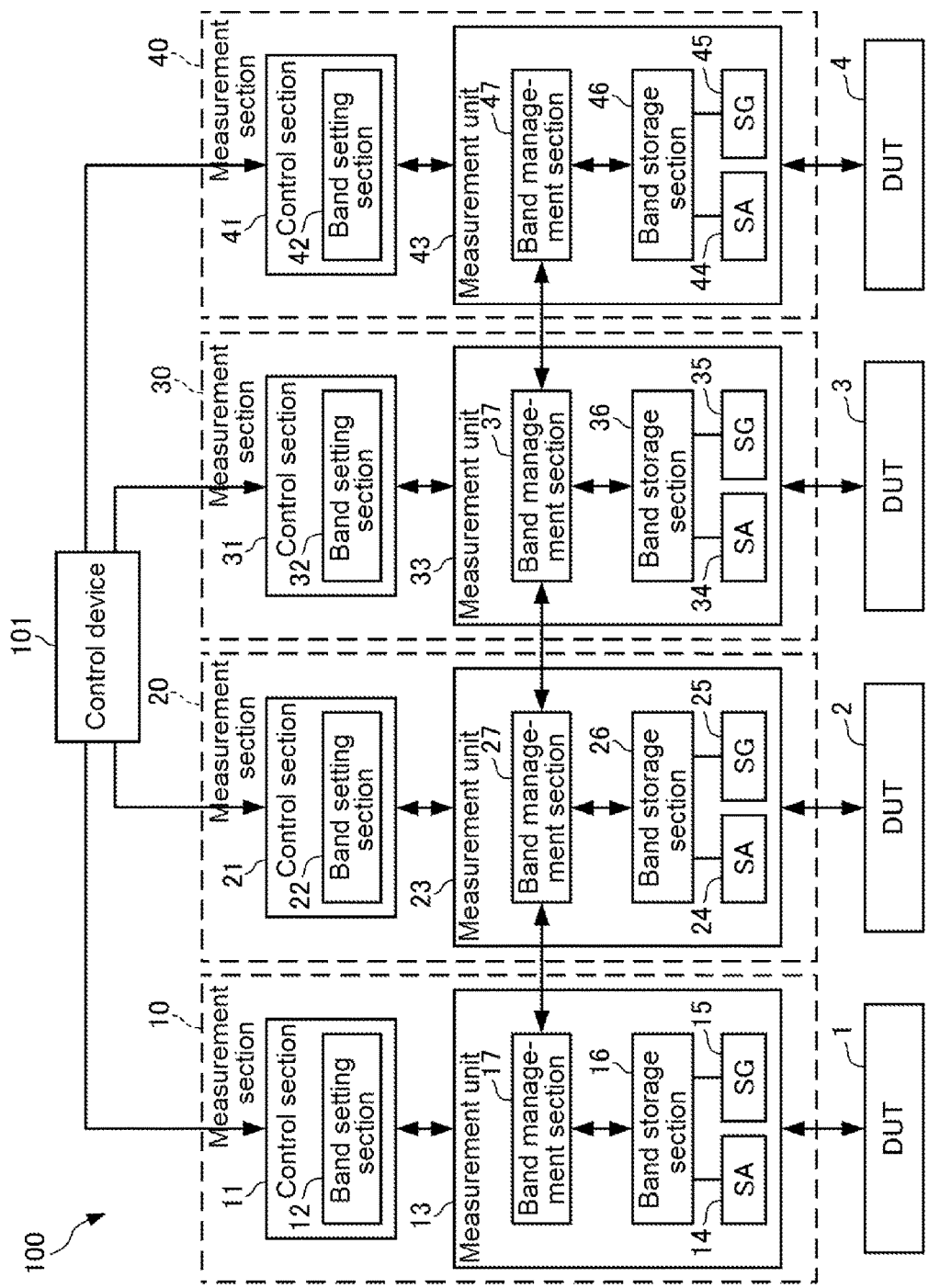
FIG. 1 is a block diagram illustrating a configuration in a first embodiment of a measurement device according to the invention.

As illustrated in FIG. 1, a measurement device 100 in this embodiment includes measurement sections 10, 20, 30, and 40 (hereinafter collectively referred to as "measurement section 10 and the like"), and a control device 101.

The measurement device 100 includes a microcomputer including, for example, a CPU, a ROM, a RAM, and an input and output circuit to which various interfaces are connected. The measurement device 100 causes the microcomputer to function as each functional section of the measurement device 100 by executing a control program stored in the ROM in advance.

The measurement section 10 and the like are connected to a plurality of devices to be measured (hereinafter referred to as "DUTs") 1 to 4 capable of using a plurality of frequency bands, for example, via cables or over the air (OTA), respectively, and measure at least one of transmission characteristics and reception characteristics of the respective DUTs 1 to 4 using different communication frequency bands. The measurement section 10 and the like are examples of measurement means. In this embodiment, the measurement section 10 and the like are assumed to measure the transmission characteristics and the reception characteristics of the DUTs 1 to 4 using signals in a 2 GHz band and a 5 GHz band that are used in a wireless LAN. That is, the DUTs 1 to 4 are examples of devices that use a plurality of frequency bands and are, for example, portable terminal devices.

The measurement section 10 includes a control section 11 that performs control for measurement of the DUT 1, and a measurement unit 13 that measures the transmission characteristics and the reception characteristics of the DUT 1.

The control section 11 performs control for measurement of the DUT 1 on the measurement unit 13, and includes a band setting section 12. Further, the control section 11 can communicate with the DUT 1 via the measurement unit 13. For example, the control section 11 notifies the DUT 1 of a band frequency that is used in a signal from the DUT 1 when the transmission characteristics of the DUT 1 are measured. Further, for example, the control section 11 acquires data indicating the reception characteristics of the DUT 1 from the DUT 1 when the reception characteristics of the DUT 1 is measured. The measurement unit 13 includes a signal analysis device (hereinafter referred to as "SA") 14, a signal generation device (hereinafter referred to as "SG") 15, a band storage section 16, and a band management section 17. The control section 11 may be configured to be provided in an external device of the measurement device 100, such as a personal computer.

A configuration of the measurement sections 20, 30, and 40 are the same as the measurement section 10. That is, the measurement section 20 includes a control section 21, a band setting section 22, a measurement unit 23, an SA 24, an SG 25, a band storage section 26, and a band management section 27. The measurement section 30 includes a control section 31, a band setting section 32, a measurement unit 33, an SA 34, an SG 35, a band storage section 36, and a band management section 37. The measurement section 40 includes a control section 41, a band setting section 42, a measurement unit 43, an SA 44, an SG 45, a band storage section 46, and a band management section 47. Hereinafter, a configuration of the measurement section 10 as a representative configuration of respective configurations of the measurement section 10 and the like will be described, and repeated description of the measurement sections 20, 30, and 40 will be omitted.

The band setting section 12 sets a frequency band handled by the SA 14 and the SG 15 of the own measurement section 10 on the basis of information on the frequency band stored in the storage band storage sections 26, 36, and 46 of the other measurement sections 20, 30, and 40 other than the own measurement section 10. The band setting section 12 is an example of used band setting means.

Similarly, the band setting section 22 of the measurement section 20 sets a frequency band handled by the SA 24 and the SG 25 of the own measurement section 20 on the basis of information on the frequency band stored in the storage band storage sections 16, 36, and 46 of the other measurement sections 10, 30, and 40. The band setting section 32 of the measurement section 30 sets a frequency band handled by the SA 34 and the SG 35 of the own measurement section 30 on the basis of information on the frequency band stored in the storage band storage sections 16, 26, and 46 of the other measurement sections 10, 20, and 40. The band setting section 42 of the measurement section 40 sets a frequency band handled by the SA 44 and the SG 45 of the own measurement section 40 on the basis of information on the frequency band stored in the storage band storage sections 16, 26, and 36 of the other measurement sections 10, 20, and 30.

The SA 14 receives a signal having a frequency in a predetermined frequency band in order to measure the transmission characteristics of the DUT 1 from the DUT 1. This SA 14 is an example of signal input means and is, for example, a signal analysis device such as a spectrum analyzer.

The SG 15 outputs a signal having a frequency in a predetermined frequency band in order to measure the reception characteristics of the DUT 1 to the DUT 1. This SG 15 is an example of signal output means and is, for example, a signal generation device that generates a signal at a predetermined frequency or a pattern signal for test.

The band storage section 16 stores information on the frequency band (hereinafter referred to as "use frequency band information") handled by the SA 14 and the SG 15. This band storage section 16 is an example of used band information storage means. In this embodiment, the band storage section 16 is assumed to store the use frequency band information of both the SA 14 and the SG 15, but the present invention is not limited thereto. For example, the SA 14 and the SG 15 may include memories, respectively, and the use frequency band information may be separately stored in each memory.

The band management section 17 executes a process of storing the use frequency band information of the SA 14 and the SG 15 in the band storage section 16, a process of clearing information on the use frequency band from the band storage section 16 on the basis of an instruction of the control section 11 when the SA 14 and the SG 15 end the measurement, or the like.

Further, the band management section 17 acquires the information of the frequency band stored in the band storage sections 26, 36, and 46 via the band management sections 27, 37, and 47 of the other measurement sections 20, 30, and 40 other than the own measurement section 10. In other words, the band management section 17 acquires the use frequency band information of the SA 24 and the SG 25 of the measurement section 20, the SA 34 and the SG 35 of the measurement section 30, and the SA 44 and the SG 45 of the measurement section 40.

The band management section 27 acquires the use frequency band information of the SA 14 and the SG 15 of the measurement section 10, the SA 34 and the SG 35 of the measurement section 30, and the SA 44 and the SG 45 of the measurement section 40, similar to the band management section 17. Further, the band management section 37 acquires the use frequency band information of the SA 14 and the SG 15 of the measurement section 10, the SA 24 and the SG 25 of the measurement section 20, and the SA 44 and the SG 45 of the measurement section 40. Further, the band management section 47 acquires the use frequency band information of the SA 14 and the SG 15 of the measurement section 10, the SA 24 and the SG 25 of the measurement section 20, and the SA 34 and the SG 35 of the measurement section 30.

With this configuration, the band management sections 17, 27, 37, and 47 can acquire the frequency band used by the other measurement sections other than the own measurement section. Thus, the measurement section 10 and the like can measure the transmission characteristics and the reception characteristics of the respective DUTs 1 to 4 using the signals in different frequency bands.

The control device 101 controls an operation of each of the control sections 11, 21, 31 and 41 of the measurement section 10 and the like.

Next, each function of the band setting section 12, band storage section 16, and the band management section 17 will be described with reference to FIG. 2. In order to simplify the description, the measurement sections 10, 20 and 30 will be described by way of example.

Figure 2:
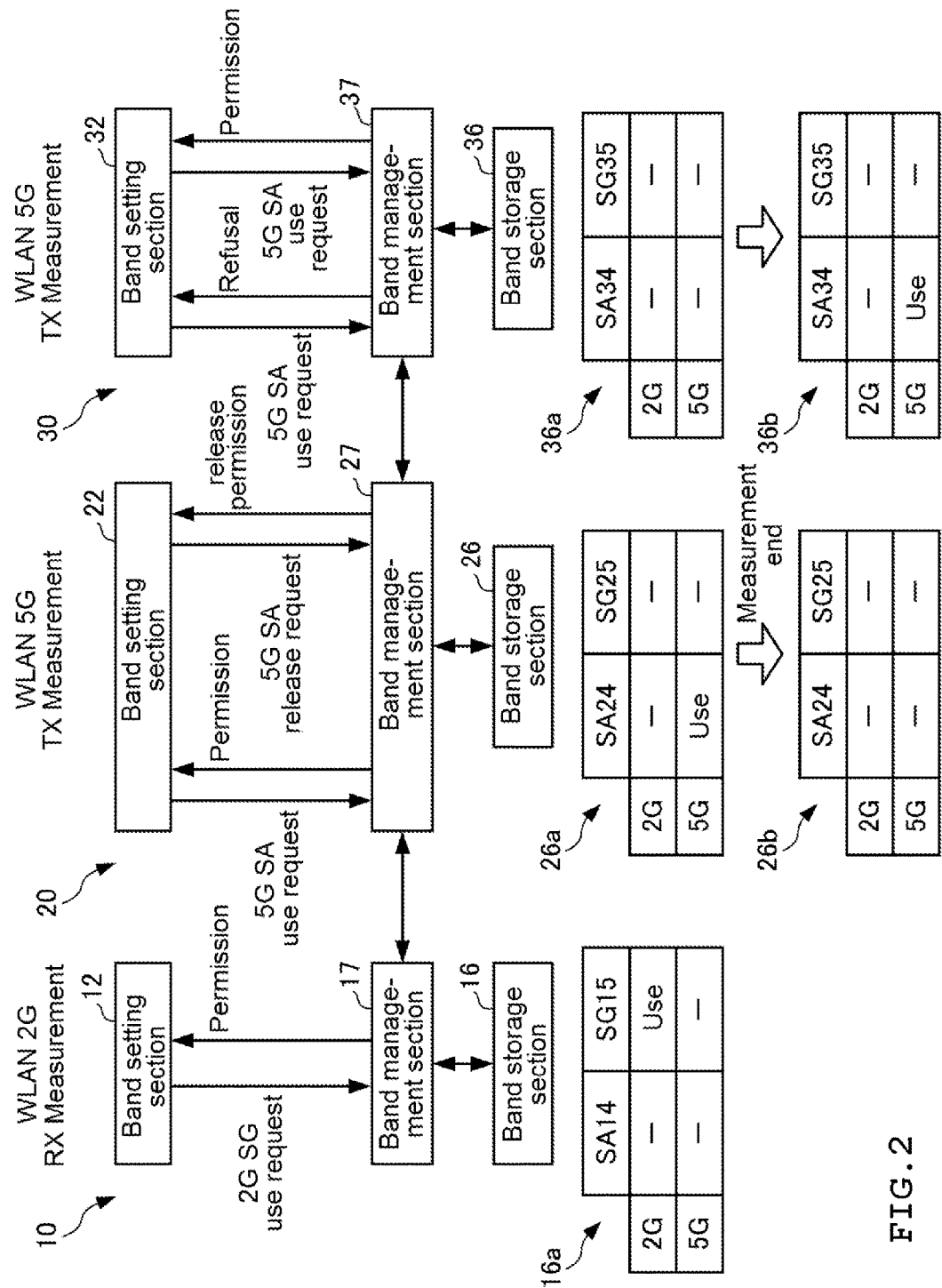
FIG. 2 is an illustrative diagram of respective functions of a band setting section, a band storage section, and a band management section in the first embodiment of the measurement device according to the present invention.

In FIG. 2, a wireless LAN is represented as WLAN, a 2 GHz band is represented as 2G, a 5 GHz band is represented as 5G, measurement of reception characteristics is represented as RX measurement, and measurement of transmission characteristics is represented as TX measurement. As illustrated in FIG. 2, the band storage section 16 includes a table (hereinafter referred to as a "used band table") 16a that stores the use frequency band information of the SA 14 and the SG 15. The band storage section 26 includes a used band table 26a of the SA 24 and the SG 25. The band storage section 36 includes a used band table 36a of the SA 34 and the SG 35. In an initial state, the used band tables 16a, 26a, and 36a are cleared.

First, the measurement section 10 is assumed to request measurement of reception characteristics of the DUT 1 in a 2 GHz band of a wireless LAN. In this case, the band setting section 12 outputs a use request for use of the SG 15 in the 2 GHz band to the band management section 17. The band management section 17 confirms the used band tables 26a and 36a of the band storage sections 26 and 36 via the band management sections 27 and 37. Since the used band tables 26a and 36a are cleared in the initial state and information indicating that the 2 GHz band is used is not registered, the band management section 17 outputs a signal indicating use permission in response to the use request for use of the SG 15 in the 2 GHz band to the band setting section 12.

When the band setting section 12 receives the signal indicating the use permission, the band setting section 12 instructs the band management section 17 to store information indicating use of the SG 15 in a 2 GHz band in the band storage section 16. As a result, the information indicating use of the SG 15 in the 2 GHz band is stored in the used band table 16a by the band management section 17.

Then, when the measurement section 20 requests measurement of the transmission characteristics of the DUT 2 in the 5 GHz band of the wireless LAN, the band setting section 22 outputs a use request for use of the SA 24 in the 5 GHz band to the band management section 27. The band management section 27 confirms the used band tables 16a and 36a of the band storage sections 16 and 36 via the band management sections 17 and 37. Here, since information indicating use of the 5 GHz band is not stored in the used band tables 16a and 36a, the band management section 27 outputs a signal indicating use permission in response to the use request for use of the SA 24 in the 5 GHz band to the band setting section 22.

When the band setting section 22 receives the signal indicating the use permission, the band setting section 22 instructs the band management section 27 to store information indicating use of the SA 24 in a 5 GHz band in the band storage section 26. As a result, the information indicating use of the SA 24 in the 5 GHz band is stored in the used band table 26a by the band management section 27.

Then, when the measurement section 30 requests measurement of the transmission characteristics of the DUT 3 in the 5 GHz band of the wireless LAN, the band setting section 32 outputs a use request for use of the SA 34 in the 5 GHz band to the band management section 37. The band management section 37 confirms the used band tables 16a and 26a of the band storage sections 16 and 26 via the band management sections 17 and 27. Since information indicating use of the 5 GHz band is stored in the used band tables 26a, the band management section 37 outputs a signal indicating refusal in response to the use request for use of the SA 24 in the 5 GHz band to the band setting section 32. In this case, the band setting section 32 enters a standby state in which the use request is repeatedly sent to the band management section 37 at predetermined intervals until the use request for use of the SA 34 in the 5 GHz band is permitted.

Then, in a case where the measurement section 20 has measured the transmission characteristics of the DUT 2 in the 5 GHz band of the wireless LAN, the band setting section 22 outputs a request to the band management section 27 to release (clear) the information stored to use the SA 24 in the 5 GHz band. The band management section 27 clears the information on use of the SA 24 in the 5 GHz band stored in the used band table 26a. As a result, the used band table 26b is obtained.

Since the information indicating that the measurement section 20 uses the 5 GHz band is cleared, the band management section 37 outputs a signal indicating use permission to the band setting section 32 in response to the use request for use of the SA 34 in the 5 GHz band. As a result, in the measurement section 30, information indicating the use of the SA 34 in the 5 GHz band is recorded by the band management section 37, and the used band table 36a becomes a used band table 36b.

Next, a measurement example of the DUTs 1 to 4 in measurement section 10 and the like will described with reference to FIG. 3.

Figure 3:
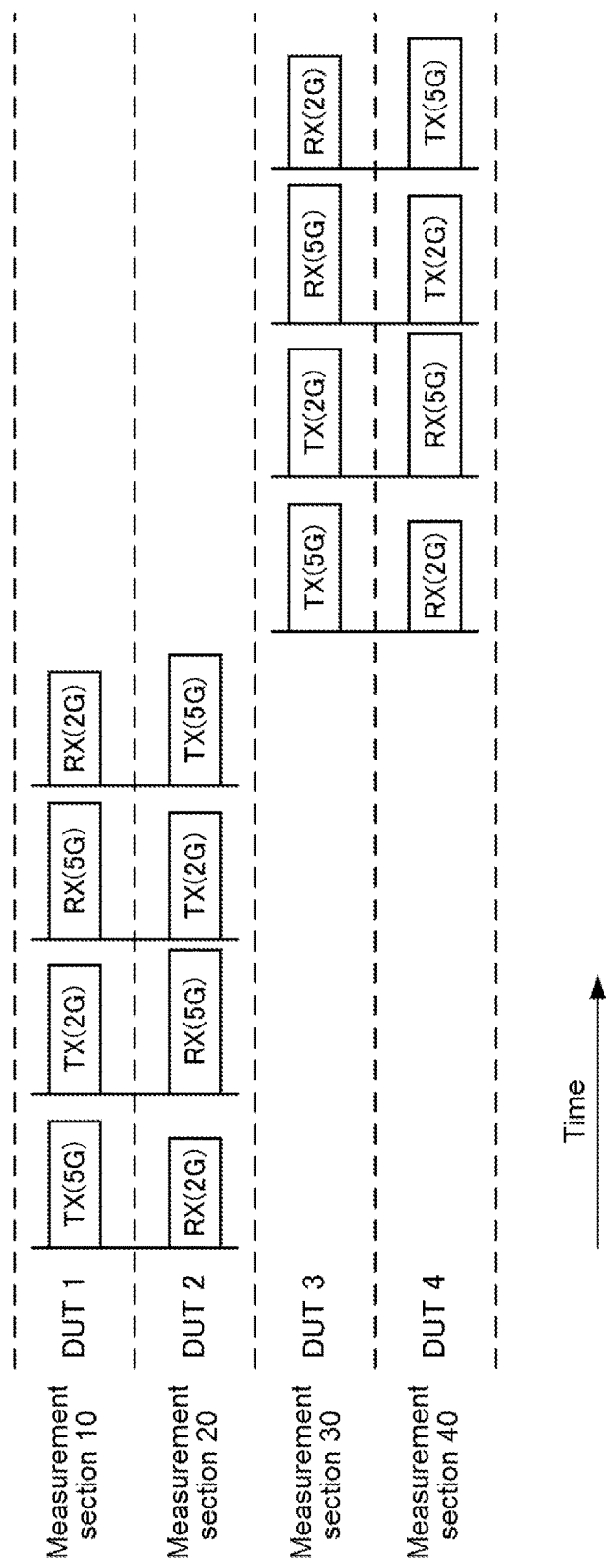
FIG. 3 is a diagram illustrating an example of measurement of each DUT in the first embodiment of the measurement device according to the present invention.

In FIG. 3, an example in which the measurement section 10 sequentially measures transmission characteristics (TX (5G)) in a 5 GHz band, transmission characteristics (TX (2G)) in a 2 GHz band, reception characteristics (RX (5G)) in a 5 GHz band, and reception characteristics (RX (2G)) in a 2 GHz band of the DUT 1 is illustrated.

If the transmission characteristics in the 5 GHz band in the DUT 1 are measured, the measurement section 20 does not use the 5 GHz band. In this example, the measurement section 20 measures the reception characteristics (RX (2G)) of the DUT 2 in the 2 GHz band in parallel with the measurement of the transmission characteristics (TX (5G)) in the measurement section 10. Hereinafter, similarly, an example in which the measurement section 20 sequentially measures reception characteristics (RX (5G)) in a 5 GHz band, transmission characteristics (TX (2G)) in a 2 GHz band, and transmission characteristics (TX (5G)) in a 5 GHz band of the DUT 2 is illustrated.

On the other hand, when the measurement sections 10 and 20 use the 2 GHz band and the 5 GHz band, the measurement sections 30 and 40 enter a standby state to repeat a use request until a frequency band desired to be used is released.

In an operation example illustrated in FIG. 3, each measurement start time is the same between the measurement sections 10 and 20 and between the measurement sections 30 and 40, but the present invention is not limited thereto and frequency bands of measurements that are performed in parallel may be different.

Further, although a combination of the transmission characteristics and the reception characteristics is used in the operation example illustrated in FIG. 3, a combination of transmission characteristics and a combination of reception characteristics may be used as long as frequency bands are different.

Further, in the operation example illustrated in FIG. 3, the example in which the measurement of the DUT 1 and the DUT 2 ends, and then, the DUT 3 and the DUT 4 are measured has been described, but the present invention is not limited thereto. For example, an order of measurement of DUTs may be determined in an order of measurement sections permitted to use a desired frequency band. For example, the measurement of (TX (2G)) of the DUT 1 and (RX (5G)) of the DUT 3 may be performed subsequently to the measurement of (TX (5G)) of the DUT 1 and (RX (2G)) of the DUT 2.

First, although two DUTs are simultaneously measured in parallel since there are two frequency bands in the operation example illustrated in FIG. 3, three DUTs may be measured in parallel if there are, for example, three different frequency bands.

Figure 4:
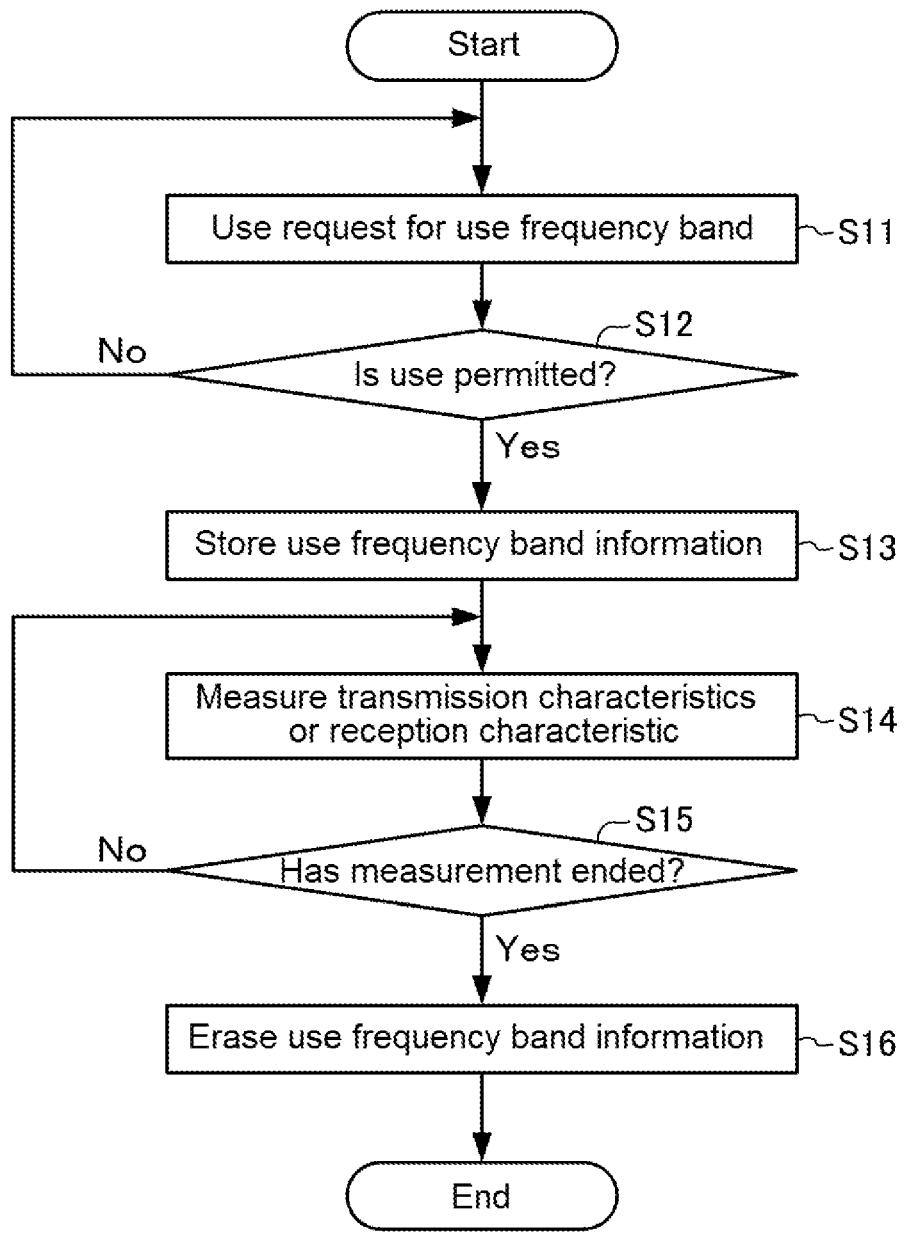
FIG. 4 is a flowchart illustrating an operation in the first embodiment of the measurement device according to the present invention.

Next, an operation of the measurement device 100 in this embodiment will be described with reference to FIG. 4. In this example, the measurement section 10 is assumed to perform measurement in parallel to the measurement section 20. Specifically, the measurement section 10 measures transmission characteristics in a 5 GHz band of a wireless LAN, and the measurement section 20 measures reception characteristics in a 2 GHz band of the wireless LAN. Further, the use frequency band information is assumed not to be stored in the band storage section 16 and the like as an initial state before the operation starts.

First, an operation of the measurement section 10 will be described.

The band setting section 12 executes a use request for a use frequency band 5 GHz in order to use the SA 14 in a 5 GHz band (step S11).

The band management section 17 determines whether or not to permit use in response to a use request for a use frequency band 5 GHz (step S12). Specifically, the band management section 17 refuses the use request when the use frequency band information on the frequency band 5 GHz is stored in the band storage sections 26, 36, and 46 via the band management sections 27, 37, and 47 of the other measurement sections 20, 30, and 40 other than the own measurement section 10 (NO), and permits the use request when the use frequency band information on the frequency band 5 GHz is not stored (YES). In this operation example, since the use frequency band information is not stored in an initial state, the band management section 17 permits the use request.

In step S12, when the band management section 17 does not permit the use, the process returns to step S11.

On the other hand, in step S12, when the band management section 17 permits the use, the control section 11 causes the band management section 17 to store the use frequency band information on the frequency band 5 GHz in the band storage section 16 (step S13). Here, the control section 11 instructs the DUT 1 to transmit predetermined measurement data using the frequency band 5 GHz via the measurement unit 13.

The SA 14 receives the measurement data using the frequency band 5 GHz output from the DUT 1, and measures the transmission characteristics of the DUT 1 on the basis of the measurement parameter received from the control section 11 (step S14).

The control section 11 determines whether or not the measurement of the SA 14 has ended (step S15).

In step S15, when the control section 11 does not determine that the measurement has ended, the process returns to step S14.

On the other hand, in step S15, when the control section 11 determines that the measurement has ended, the control section 11 causes the band management section 17 to erase the use frequency band information on the frequency band 5 GHz stored in the band storage section 16 (step S16).

Next, an operation of the measurement section 20 will be described.

The band setting section 22 executes a use request for the use frequency band 2 GHz in order to use the SG 25 in the 2 GHz band (step S11).

The band management section 27 determines whether or not to permit use in response to a use request for a use frequency band 2 GHz (step S12). Specifically, the band management section 27 refuses the use request when the use frequency band information on the frequency band 2 GHz is stored in the band storage sections 16, 36, and 46 via the band management sections 17, 37, and 47 of the other measurement sections 10, 30, and 40 other than the own measurement section 20 (NO), and permits the use request when the use frequency band information on the frequency band 2 GHz is not stored (YES). In this operation example, since the use frequency band information on the frequency band 2 GHz is not stored, the band management section 27 permits the use request.

In step S12, when the band management section 27 does not permit the use, the process returns to step S11.

On the other hand, in step S12, when the band management section 27 permits the use, the control section 11 causes the band management section 17 to store the use frequency band information on the frequency band 2 GHz in the band storage section 26 (step S13).

The SG 25 generates a signal on the basis of the measurement parameter received from the control section 21 and outputs measured data in the frequency band 2 GHz to the DUT 2, and the DUT 2 measures reception characteristics (step S14).

The control section 21 determines whether or not the measurement of the SG 25 has ended (step S15).

In step S15, when the control section 21 does not determine that the measurement has ended, the process returns to step S14.

On the other hand, in step S15, when the control section 21 determines that the measurement has ended, the control section 21 causes the band management section 27 to erase the use frequency band information on the frequency band 2 GHz stored in the band storage section 26 (step S16).

Using the above-described operation, the measurement device 100 can perform the measurement of TX (5G) of the DUT 1 and the measurement of RX (2G) of the DUT 2 that are initial measurements of the DUT 1 and the DUT 2 illustrated in FIG. 3 is parallel without causing signal interference. As a result, the measurement device 100 can efficiently perform the measurement of TX (5G) of the DUT 1 and the measurement of RX (2G) of the DUT 2 at a high speed, and improve measurement accuracy of each measurement.

Since the measurement device 100 in this embodiment can measure at least one of the transmission characteristics and the reception characteristics of the DUTs 1 to 4 using the signals in the different frequency bands as described above, it is possible to prevent signal interference and achieve improvement of measurement accuracy even when a plurality of devices to be measured capable of using a plurality of frequency bands are measurement targets In the above-described embodiment, the signals in the 2 GHz band and the 5 GHz band in the wireless LAN have been described as examples of the signals in different frequency bands, but the present invention is not limited thereto. For example, the same effects can be obtained in a configuration in which the measurement section 10 uses a signal in one frequency band defined in the Wideband-Code Division Multiple Access (W-CDMA), and the measurement section 20 uses a signal in a frequency band defined in the Long Term Evolution (LTE) as another frequency band different from the one frequency band.

Further, the same effects are obtained, for example, in a configuration in which the measurement section 10 uses a frequency of one of channels defined in the LTE, and the measurement section 20 uses the other channels defined in the LTE.

Modification Example

A modification example of the measurement device 100 in the first embodiment will be described. The same components with each other to simplify the description are denoted by the "equal" to the representative encoder.

In the above-described measurement device 100 (see FIG. 1), the example in which the measurement section 10 and the like include the band setting section 12 and the like, the band management section 17 and the like, and the band storage section 16 and the like, respectively, has been described.

Figure 5:
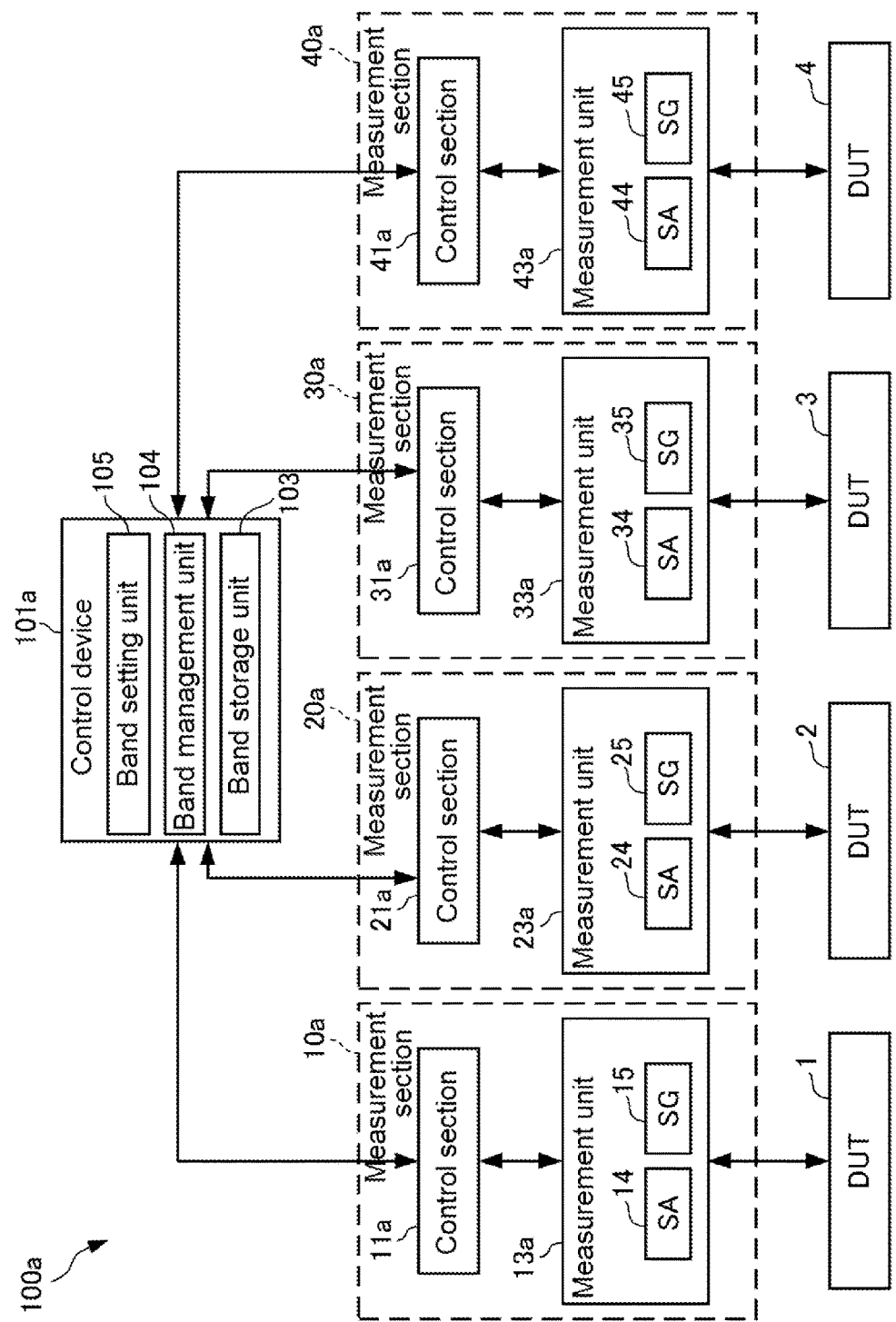
FIG. 5 is a block diagram illustrating a configuration in a modification example of the first embodiment of the measurement device according to the present invention.

On the other hand, as illustrated in FIG. 5, a measurement device 100a in the modification example includes a control device 101a, and a measurement section 10a and the like, and the control device 101a includes a band storage section 103, a band management section 104, and a band setting section 105.

The band storage section 103 stores use frequency band information of an SA 14 and the like, and an SG 15 and the like.

The band management section 104 executes a process of storing the use frequency band information of the SA 14 and the like and the SG 15 and the like in the band storage section 103, a process of clearing information on a use frequency band from the band storage section 103 when the SA 14 and the like and the SG 15 and the like end measurement, or the like.

The band setting section 105 set frequency bands handled by the SA 14 and the like and the SG 15 and like included in the measurement section 10a and the like.

With this configuration, in the measurement device 100a of the modification example, since the control device 101a generically performs a process for the use frequency band information, it is possible to simplify a configuration of the measurement section 10 and the like.

Second Embodiment

First, a configuration in a second embodiment of the measurement device according to the present invention will be described.

Figure 6:
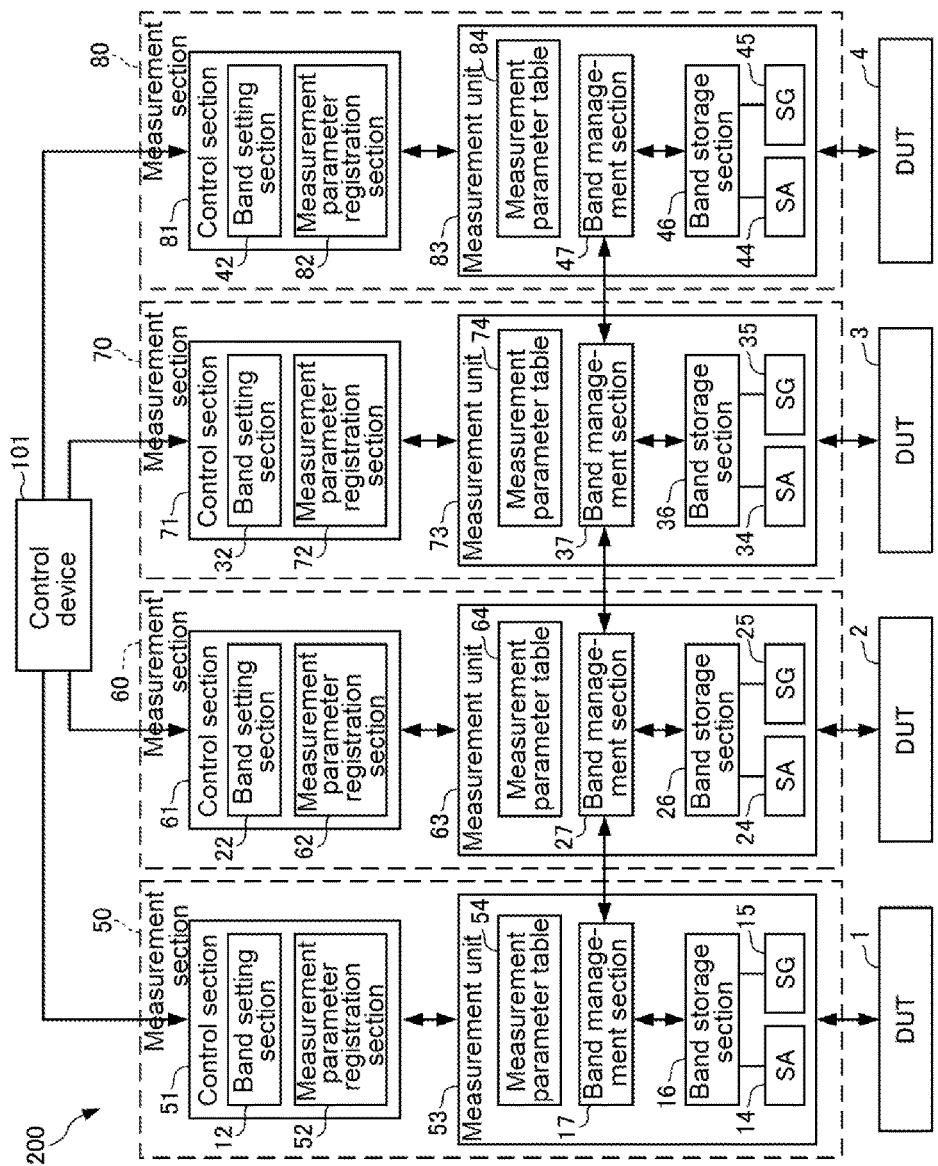
FIG. 6 is a block diagram illustrating a configuration of a second embodiment of the measurement device according to the present invention.

As illustrated in FIG. 6, a measurement device 200 in this embodiment is obtained by partially changing the measurement device 100 (see FIG. 1) of the first embodiment. Therefore, the same components as those in the measurement device 100 are denoted with the same reference numerals, and a description thereof will be omitted.

The measurement device 200 of this embodiment includes measurement sections 50, 60, 70, and 80. Hereinafter, the measurement section 50 will be described as a representative configuration, and description of the measurement sections 60, 70, and 80 will be omitted.

The measurement section 50 includes a control section 51, and a measurement unit 53. The control section 51 includes a measurement parameter registration section 52. The measurement unit 53 includes a measurement parameter table 54.

The measurement parameter registration section 52 registers a predetermined measurement parameter in the measurement parameter table 54 before start of measurement.

The SA 14 analyzes a signal input from the DUT 1 on the basis of the measurement parameter registered in the measurement parameter table 54 by referring to the measurement parameter table 54 before start of measurement.

The SG 15 generates a signal to be output to the DUT 1 on the basis of the measurement parameter registered in the measurement parameter table 54 by referring to the measurement parameter table 54 before start of measurement.

In the SA 14 that measures the transmission characteristic, the measurement parameters include respective parameters for measurement items such as transmission power, an error vector magnitude (EVM), and spurious for a transmission signal of the DUT 1. Further, in the SG 15 for measuring the reception characteristic, the measurement parameters include respective parameters for measurement items such as reception sensitivity and a bit error rate. When each measurement parameter serving as measurement conditions (for example, a frequency, a signal level, and the number of selections of a measurement item) of each measurement item is finely set, the number of items greatly increases, and a measurement time is long since the control section 51 indicates the measurement parameters to the measurement unit 53 for each measurement.

Therefore, in this embodiment, the configuration in which the measurement parameter registration section 52 registers predetermined measurement parameters in the measurement parameter table 54 before start of measurement, and the SA 14 and the SG 15 operate on the basis of the measurement parameters registered in the measurement parameter table 54 is adopted.

Figure 7:
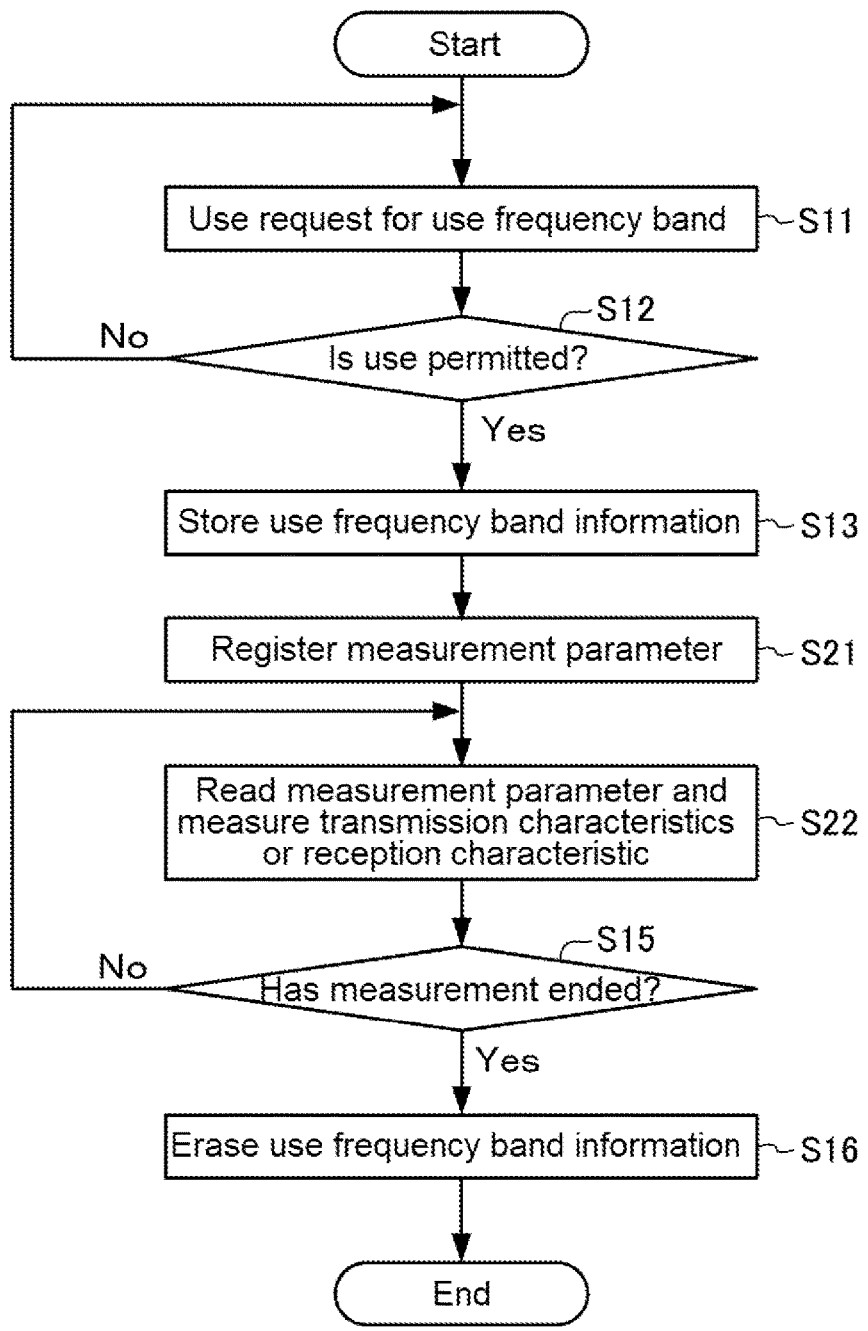
FIG. 7 is a flowchart illustrating an operation in the second embodiment of the measurement device according to the present invention.

Next, an operation of the measurement device 200 in this embodiment will be described with reference to FIG. 7. In this example, it is assumed that the measurement section 50 performs measurement in parallel to the measurement section 60 under the same conditions as in the first embodiment. The same operation as in each step of the first embodiment (see FIG. 4) is denoted with the same reference numeral and description thereof may be omitted.

First, an operation of the measurement section 50 will be described.

In step S13, the band management section 17 stores the use frequency band information on the frequency band 5 GHz in the band storage section 16, and then, the measurement parameter registration section 52 registers a predetermined measurement parameter in the measurement parameter table 54 (step S21).

The SA 14 receives measurement data using the frequency band 5 GHz that is output from the DUT 1, reads the measurement parameter from the measurement parameter table 54, and measures the transmission characteristics of the DUT 1 on the basis of the read measurement parameter (step S22).

Next, an operation of the measurement section 60 will be described.

In step S13, the band management section 67 stores the use frequency band information on the frequency band 2 GHz in the band storage section 66, and then, the measurement parameter registration section 62 registers a predetermined measurement parameter in the measurement parameter table 64 (step S21).

The SG 25 reads the measurement parameter from the measurement parameter table 54, and generates a signal in the frequency band 2 GHz that is output to the DUT 1 on the basis of the read measurement parameter (step S22).

As described above, the measurement device 200 in this embodiment is configured to register the predetermined measurement parameters before start of measurement and perform the measurement on the basis of the registered measurement parameters. Thus, it is possible to achieve a shortened measurement time, in addition to the effects of the first embodiment.

As described above, the measurement device and the measurement method according to the present invention have an effect that it is possible to prevent signal interference and achieve improvement of measurement accuracy even when a plurality of devices to be measured capable of using a plurality of frequency bands are measurement targets, and are useful as a measurement device and a measurement method capable of simultaneously measuring the transmission characteristics and the reception characteristics of the device to be measured.

DESCRIPTION OF REFERENCE NUMERALS AND SIGNS 1, 2, 3, 4 DUT (device to be measured)
10, 10a, 20, 30, 40, 50, 60, 70, 80 measurement section (measurement means)
11, 21, 31, 41, 51 control section
12, 22, 32, and 42 band setting section (used band setting means)
105 band setting section (band setting means)
13, 23, 33, 43, 53 measurement unit
14, 24, 34, 44 SA (signal input means)
15, 25, 35, 45 SG (signal output means)
16, 26, 36, 46 band storage section (used band information storage means)
16a, 26a used band table
17, 27, 37, 47 band management section
26a, 26b, 36a, 36b used band table
52, 62 measurement parameter registration section (measurement parameter registration means)
54, 64 measurement parameter table
100, 100a, 200 measurement device
101, 101a control device
103 band storage section (band information storage means)
105 band setting section (band setting means)

What is claimed is:

1. A measurement device, comprising:
a plurality of measurement means that are respectively connected to a plurality of devices to be measured capable of using a plurality of communication frequency bands, and perform measurements of at least one of transmission characteristics and reception characteristics of the plurality of devices to be measured in parallel using different communication frequency bands,
wherein the communication frequency bands correspond to different channels and/or different communication protocols,
wherein each of the plurality of measurement means comprises:
signal input means for receiving a signal for measuring the transmission characteristics with a frequency in a communication frequency band from each of the plurality of measurement devices, respectively; and
signal output means for outputting a signal for measuring the reception characteristics with a frequency in a communication frequency band to each of the plurality of devices to be measured, respectively,
wherein the measurement device further comprises:
band information storage means for storing information on the communication frequency bands handled by the plurality of signal input means and the plurality of signal output means;
band setting means for setting a communication frequency band handled by the plurality of signal input means and the plurality of signal output means; and
band management means for executing a process of storing information on a communication frequency band handled by the plurality of signal input means and the plurality of signal output means in the band information storage means, and clearing the information on the used communication frequency band from the band information storage means when the plurality of signal input means and the plurality of signal output means end measurement,
wherein the band setting means outputs a use request for use of the signal input means or the signal output means, and a communication frequency band desired to be used, to the band management means,
wherein the band management means determines permission or refusal in response to the use request on the basis of the information on the communication frequency band stored in the band information storage means with respect to the band setting means, and
wherein the band management means determines refusal when the communication frequency band for which the use request is made is already stored in the band information storage means, and determines permission when the communication frequency band for which the use request is made is not stored in the band information storage means and stores information on the communication frequency band for which the use request is made in the band information storage means.

2. The measurement device according to claim 1, further comprising:
control means including the band information storage means, the band management means, and the band setting means, and collectively performing processes on respective pieces of frequency band information of the plurality of measurement means.

3. A measurement device, comprising:
a plurality of measurement means that are respectively connected to a plurality of devices to be measured capable of using a plurality of communication frequency bands, and perform measurements of at least one of transmission characteristics and reception characteristics of the plurality of devices to be measured in parallel using different communication frequency bands,
wherein the communication frequency bands correspond to different channels and/or different communication protocols,
wherein each of the plurality of measurement means comprises:
signal input means for receiving a signal for measuring the transmission characteristics with a frequency in a communication frequency band from each of the plurality of measurement devices, respectively; and
signal output means for outputting a signal for measuring the reception characteristics with a frequency in a communication frequency band to each of the plurality of devices to be measured, respectively,
wherein the measurement device further comprises:
band information storage means for storing information on the communication frequency bands handled by the plurality of signal input means and the plurality of signal output means;
band setting means for setting a communication frequency band handled by the plurality of signal input means and the plurality of signal output means; and
band management means for executing a process of storing information on a communication frequency band handled by the plurality of signal input means and the plurality of signal output means in the band information storage means, and clearing the information on the used communication frequency band from the band information storage means when the plurality of signal input means and the plurality of signal output means end measurement, wherein the band setting means outputs a use request for use of the signal input means or the signal output means, and a communication frequency band desired to be used, to the band management means, wherein the band management means determines permission or refusal in response to the use request on the basis of the information on the communication frequency band stored in the band information storage means with respect to the band setting means, and wherein in the plurality of measurement means:

the band information storage means is included in the plurality of measurement means, and includes a plurality of used band information storage means for storing information on a communication frequency band handled by the signal input means and the signal output means of the own measurement means; and the band setting means is included in the plurality of measurement means, and includes used band setting means for setting the communication frequency band handled by the signal input means and the signal output means of the own measurement means on the basis of information on the communication frequency band stored in the used band information storage means of another measurement means.

4. The measurement device according to claim 3, wherein the signal input means is signal analysis means for analyzing a signal input from the device to be measured, the measurement device further comprises measurement parameter registration means for registering predetermined measurement parameters before start of measurement, and the signal analysis means analyzes a signal input from the device to be measured on the basis of the measurement parameters.

5. The measurement device according to claim 3, wherein the signal output means is signal generating means for generating a signal to be output to the device to be measured, the measurement device further comprises measurement parameter registration means for registering predetermined measurement parameters before start of measurement, and the signal generating means generates a signal to be output to the device to be measured on the basis of the measurement parameters.

6. A measurement method using a measurement device comprising a plurality of measurement means that are respectively connected to a plurality of devices to be measured capable of using a plurality of communication frequency bands, and perform measurements of at least one of transmission characteristics and reception characteristics of the plurality of devices to be measured in parallel using different communication frequency bands, the measurement method comprising:

performing the measurements of at least one of the transmission characteristics and the reception characteristics of the plurality of devices to be measured in parallel using signals in different communication frequency bands, wherein the communication frequency bands correspond to different channels and/or different communication protocols, wherein for each of the plurality of measurement means, the method further comprises:

receiving a signal for measuring the transmission characteristics with a frequency in a communication frequency band from each of the plurality of measurement devices, respectively; and outputting a signal for measuring the reception characteristics with a frequency in a communication frequency band to each of the plurality of devices to be measured, respectively, wherein for the measurement device, the method further comprises:

storing information on the communication frequency bands;

setting a communication frequency band;

storing information on a communication frequency band;

clearing the stored information on the used communication frequency band when measurement is ended;

outputting a use request for use of the plurality of measurement means and a communication frequency band desired to be used; and determining permission or refusal in response to the use request based on the stored information on the communication frequency band, wherein when the communication frequency band for which the use request is made is already stored, the method further comprises determining refusal, and wherein when the communication frequency band for which the use request is made is not stored, the method further comprises determining permission and storing information on the communication frequency band for which the use request is made.

7. A measurement method using a measurement device comprising a plurality of measurement means that are respectively connected to a plurality of devices to be measured capable of using a plurality of communication frequency bands, and perform measurements of at least one of transmission characteristics and reception characteristics of the plurality of devices to be measured in parallel using different communication frequency bands, the measurement method comprising:

performing the measurements of at least one of the transmission characteristics and the reception characteristics of the plurality of devices to be measured in parallel using signals in different communication frequency bands, wherein the communication frequency bands correspond to different channels and/or different communication protocols, wherein for each of the plurality of measurement means, the method further comprises:

receiving a signal for measuring the transmission characteristics with a frequency in a communication frequency band from each of the plurality of measurement devices, respectively;

outputting a signal for measuring the reception characteristics with a frequency in a communication frequency band to each of the plurality of devices to be measured, respectively; and setting the communication frequency band handled by the measurement means based on information on the communication frequency band stored in another measurement means, wherein for the measurement device, the method further comprises:

storing information on the communication frequency bands;

setting a communication frequency band;

storing information on a communication frequency band;

clearing the stored information on the used communication frequency band when measurement is ended;

outputting a use request for use of the plurality of measurement means and a communication frequency band desired to be used; and determining permission or refusal in response to the use request based on the stored information on the communication frequency band.

8. The measurement method according to claim 7, further comprising:

registering predetermined measurement parameters before start of measurement, and analyzing a signal input from the device to be measured based on the measurement parameters.

9. The measurement method according to claim 7, further comprising:

registering predetermined measurement parameters before start of measurement, and generating a signal to be output to the device to be measured based on the measurement parameters.

* * * * *